US00RE44838E

(19) United States
(12) Reissued Patent
Nurmi

(10) Patent Number: US RE44,838 E
(45) Date of Reissued Patent: Apr. 8, 2014

(54) METHOD FOR RECEIVING INPUTS FROM USER OF ELECTRONIC DEVICE

(75) Inventor: Mikko Antero Nurmi, Tampere (FI)

(73) Assignee: Nokia Corporation, Espoo (FI)

(21) Appl. No.: 13/183,323

(22) Filed: Jul. 14, 2011

Related U.S. Patent Documents

Reissue of:

(64) Patent No.: 7,562,241
Issued: Jul. 14, 2009
Appl. No.: 11/231,119
Filed: Sep. 20, 2005

(30) Foreign Application Priority Data

Sep. 24, 2004 (WO) ..... PCT/FI2004/000563

(51) Int. Cl.
*G06F 1/32* (2006.01)

(52) U.S. Cl.
USPC ..... 713/323; 713/320; 345/173; 345/179; 715/867; 715/710

(58) Field of Classification Search
USPC ..... 713/323, 320; 345/173, 179; 715/710, 715/867
See application file for complete search history.

(56) References Cited

U.S. PATENT DOCUMENTS

| | | | | |
|---|---|---|---|---|
| 5,546,538 | A * | 8/1996 | Cobbley et al. | 709/203 |
| 5,706,457 | A * | 1/1998 | Dwyer et al. | 715/835 |
| 6,457,134 | B1 * | 9/2002 | Lemke et al. | 713/323 |
| 6,523,124 | B1 * | 2/2003 | Lunsford et al. | 713/320 |
| 6,525,716 | B1 * | 2/2003 | Makino | 345/173 |
| 6,782,484 | B2 * | 8/2004 | McGowan et al. | 713/323 |
| 6,938,174 | B2 * | 8/2005 | LeKuch et al. | 713/320 |
| 7,004,394 | B2 * | 2/2006 | Kim | 235/472.01 |
| 7,240,228 | B2 * | 7/2007 | Bear et al. | 713/320 |
| 7,301,910 | B2 * | 11/2007 | Freedman | 370/252 |
| 2002/0083357 | A1 * | 6/2002 | McGowan et al. | 713/323 |
| 2002/0130868 | A1 * | 9/2002 | Smith | 345/440 |
| 2002/0198909 | A1 * | 12/2002 | Huynh et al. | 707/513 |
| 2003/0169306 | A1 * | 9/2003 | Makipaa et al. | 345/864 |
| 2004/0049533 | A1 * | 3/2004 | Knight | 709/203 |

OTHER PUBLICATIONS

IBM Technical Disclosure Bulletin, Jan. 1989; vol. 31, No. 8, p. 28-29.*

* cited by examiner

*Primary Examiner* — Chun Cao
(74) *Attorney, Agent, or Firm* — Harrington & Smith

(57) ABSTRACT

A method of receiving inputs by an electronic device comprising a user interface component is disclosed. The user interface component is set in an inactive operating mode, such as a keypad locking mode or a screen saver mode, for substantially non-active usage of the user interface component. An input is received in the inactive mode. The input received in the inactive operating mode may be stored and presented on a user interface component.

22 Claims, 3 Drawing Sheets

METHOD FOR RECEIVING INPUTS FROM USER OF ELECTRONIC DEVICE

Matter enclosed in heavy brackets [ ] appears in the original patent but forms no part of this reissue specification; matter printed in italics indicates the additions made by reissue.

FIELD OF THE INVENTION

The invention relates to a solution for receiving inputs from a user of an electronic device, and more particularly to receiving inputs when a user interface component of an electronic device is in an inactive mode, for instance a screen saver functionality is active or a keypad lock is on.

BACKGROUND OF THE INVENTION

Various screen saver applications are well known for use in conventional computers. These screen savers are typically activated after a predetermined idle period and serve to save power and to avoid burn-in when CRT screens are used.

Portable electronic devices, such as mobile phones and PDA (Personal Digital Assistant) devices, have also been provided with screen saver applications, which enables battery power to be saved. For instance, current time is shown in the screen saver mode. U.S. patent application publication US 2003/0169306 discloses a more sophisticated screen saver in which handles for different applications may be displayed in the screen saver mode. If the user selects the handle, the respective application is executed in the screen saver mode, the application creating images shown on the screen. For instance, in the screen saver mode the user may select a handle to a weather application, whereby weather information is shown on the screen.

A keypad lock is another exemplary user interface mode for inactive use, typically enabling unwanted keypad inputs in portable devices to be avoided. The keypad lock may be activated automatically or by the user, and may be applied simultaneously with the screen saver facility.

The user may face sudden situations in which a need arises to make notes. However, it is not always so easy to make notes quickly. Typically, when a user wishes to make notes, he/she needs to exit the screen saver mode and/or keypad lock by a keystroke, go to menu, select the appropriate application (e.g. a notepad), and activate the application. Only after the application has been activated, can the user make the notes. Especially when the user is moving, this procedure is not very user-friendly or quick.

BRIEF DESCRIPTION OF THE INVENTION

An object of the invention is thus to provide a method and an apparatus implementing the method so as to enable the above-mentioned problems to be avoided or at least alleviated. The object of the invention is achieved by a method, a portable electronic device, a computer program and a computer program product which are characterized by what has been disclosed in the independent claims. Some embodiments of the invention are disclosed in the dependent claims.

According to an aspect of the invention, an electronic device comprising a user interface component and means for setting the user interface component in an inactive operating mode to be applied during non-active or limited usage of the user interface component is configured to store an input in an inactive operating mode, such as a keypad locking mode or a screen saver mode. The device is further configured to perform an action for the stored input.

The term "inactive operating mode" generally refers to any mode intended for non-active or limited usage of one or more user interface components, for instance screen saver mode or keypad lock mode. An advantage of the arrangement of the invention is that notes may be made quickly and easily although the user interface component of the device is in an inactive mode. There is no need to exit the inactive mode by a keystroke, go to menu, select the appropriate application (e.g. a notepad), and activate the appropriate application before being able to make notes, but notes may be made quickly during the inactive mode. This improves the usability of portable electronic devices. Besides storing, further actions, during the inactive mode or after exiting the inactive mode, may be performed on the input. For instance, the input may be forwarded to another device or application. According to an embodiment of the invention, the device is configured to present the input received during the inactive operating mode in a user interface component.

According to another embodiment of the invention, an application is activated to which data representing an input received in the inactive mode is then fed. This embodiment enables automatic processing of the input by the application, and it is possible to arrange different types of information to be inputted in the inactive mode. Alternatively, only an application specific input may be arranged in the inactive mode.

According to an embodiment of the invention, an input area is arranged on the screen when the user interface component is set to inactive operating mode. Inputs from the user to the input area are then received and stored. This embodiment enables one portion of the screen to be used for inputs, and other parts of the screen may be used for a screen saver facility, for instance.

According to another embodiment of the invention, a device is configured to receive an input, trigger the arrangement of the input reception means, or detect an input as an appropriate input in the inactive operating mode if a predetermined activation input has been received from the user when the device is in the inactive operating mode. This embodiment enables unwanted inputs to be avoided or at least reduced, for instance when the device is in the user's pocket.

BRIEF DESCRIPTION OF THE DRAWINGS

The invention is now described in closer detail in connection with some embodiments and with reference to the accompanying drawings, in which.

DETAILED DESCRIPTION OF THE INVENTION

Figure 1:
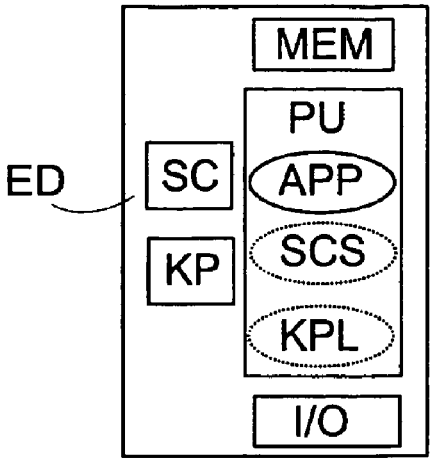
FIG. 1 is a block diagram illustrating some parts of a portable electronic device according to an embodiment.

As illustrated in FIG. 1, an electronic device ED comprises a memory MEM, a user interface, means I/O for arranging data transfer, and a processing unit PU comprising one or more processors. The user interface of the ED comprises at least a screen SC and in this embodiment also a keypad KP. Various applications APP may be implemented in the electronic device ED by executing, in the PU, a computer program code stored in the memory MEM.

In one embodiment, data may be transmitted to/from the electronic device ED, for instance wirelessly. Conventional transceivers and functionality for communicating with a network and/or other mobile terminals may be included in the electronic device ED. For instance, the electronic device ED may support GSM (Global System for Mobile Communications), GPRS (General Packet Radio Service), 3GPP ($3^{rd}$ Generation Partnership Project), WLAN (Wireless Local Area Network) and/or Bluetooth standards. The electronic device ED may be a data processing device, such as a laptop, a desktop computer, a PDA device, a mobile station, a media device such as the Nokia 7700, or a removable/portable module for some of the above-mentioned devices.

A screen saver functionality may be arranged in the electronic device ED by a screen saver program code executed in the processing unit PU, such screen saver facility being represented in FIG. 1 by reference SCS. When the screen saver SCS is activated, the screen SC is set to an inactive operating mode in which a screen saver icon is displayed, for instance. The device ED of FIG. 1 also comprises a keypad (KP) lock facility represented by reference KPL. The activation of the keypad lock KPL causes the keypad to be set into such an inactive operating mode in which only a very limited number of inputs (for instance for initiating an emergency call and for unlocking the keypad) is accepted in order to avoid unwanted keypad inputs during non-active use of the device. It is to be noted that the keypad lock, depending of the device type, may lock a physical keypad or a keypad arranged in a touch screen of an electronic device.

Computer program codes executed in the central processing unit PU may correspondingly enable the electronic device ED also to implement the inventive means relating to receiving inputs from the user while a user interface component is in an inactive mode, for instance when the screen saver SCS is active and/or while the keypad lock is on. Some embodiments of such means are illustrated in connection with FIGS. 2, 3 and 4. The computer program may be stored in a memory, e.g. on a hard disk of a PC or on a CD-ROM disc wherefrom it may be downloaded into the memory MEM of the electronic device ED executing the program. The computer program may also be downloaded via a network by using e.g. a TCP/IP protocol stack. The computer program may be a specific application for providing the inventive means and/or part of a software package comprising software also for other purposes. For instance, the software enabling user inputs during a screen saver mode as illustrated in FIG. 3 may be part of screen saver software downloadable to the electronic device ED. In another example, the inputs during the inactive mode are processed by a specific application which stores the inputs and/or forwards them to other applications. It is also feasible to use hardware solutions or a combination of hardware and software solutions to implement the inventive means.

In one embodiment, the screen SC of the device ED is a touch screen. The present method can be applied in connection with substantially all touch screen types, but the touch screen type used per se is irrelevant to the implementation of the invention. The implementation of a touch screen may be based on one of the following techniques, for instance: electrical methods, a technology based on infrared light, a technology based on sound waves or pressure recognition. Some touch screen types require a stylus with integrated electronics, such as a resonance circuit. The operation of such a screen requires a stylus to be used, and the screen cannot be used by pointing with a finger, for instance. This kind of screen type also allows a virtual stylus to be used.

Figure 2:
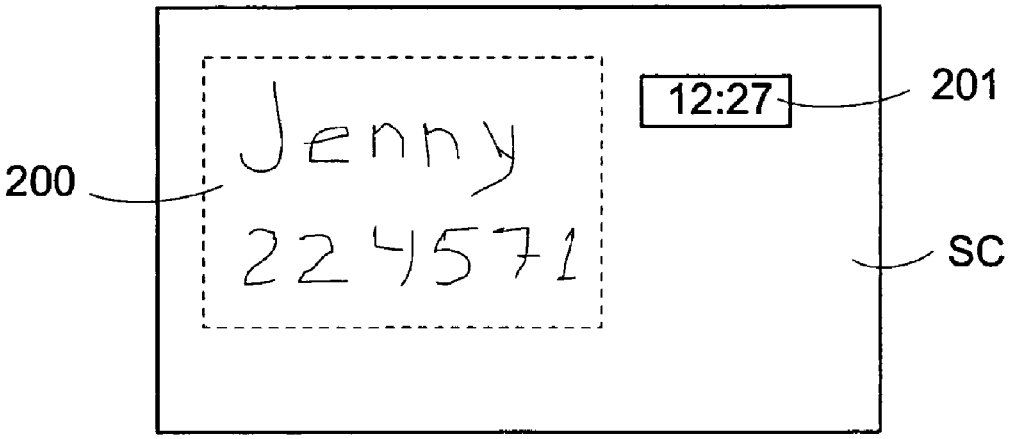
FIG. 2 shows a screen view according to an embodiment.
Figure 3:
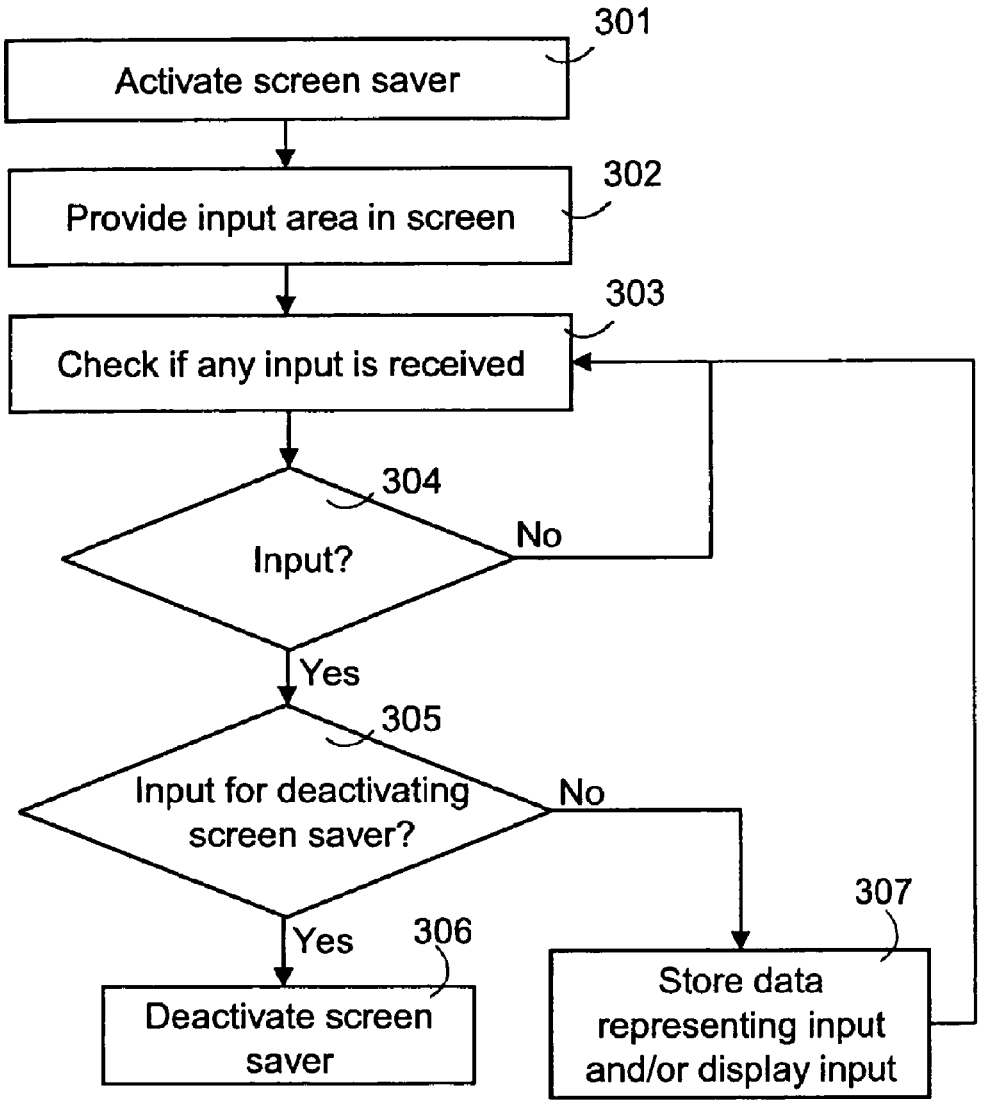
FIG. 3 is a flow diagram showing a method according to an embodiment.

FIG. 2 illustrates a screen view of an electronic device ED according to an embodiment in which a user input area 200 is arranged in the screen SC when at least one user interface component of the device ED is set to an inactive operating mode. In the example of FIG. 2, the input area 200 is limited by the dashed line, and an input made to the area 200 is detected even though the screen saver SCS and/or the keypad lock KPL, for instance, are/is active. Touch inputs to the input area 200 may be detected by touch sensitive elements in the screen SC, converted to an appropriate electronic format and displayed on the screen SC. The input area 200 for inputs in the inactive operating mode may be arranged such that only those input detection elements that reside in the area 200 are active and/or inputs from these elements are only accepted as valid input. If the screen saver SCS is activated, the screen saver SCS in this example only displays a block 201 showing time, the block 201 being arranged to change its place on the screen SC. In one embodiment, the movement of a screen saver object, such as the block 201, is arranged such that the object does not appear in the input area 200. However, it is to be noted that the input area 200 may cover the whole screen area. In such a case, any screen saver objects could move around the input area. It is also possible that multiple input areas 200 are arranged.

In the example of FIG. 2, the user has made notes to the input area 200 by a stylus. Based on the detected touching points of the stylus to the input area 200, the input area 200 has been refreshed to show the movements of the stylus. The user can thus make notes very quickly directly to the screen SC. The notes made by the user may be stored and further processed, as will be illustrated by embodiments below.

In an alternative embodiment, a cursor is arranged on the screen (SC). The device ED is then configured to determine the inputs in the input area 200 on the basis of the detected movements of the cursor. The cursor may be controlled by a conventional keypad KP or a specific control means, such as a track ball, for instance.

According to yet another embodiment, the inputs during the inactive mode are received by a conventional keypad (KP). The input area 200 may also be used and used as default for keypad inputs, or the input area 200 could be selected by a specific keystroke or cursor positioning, for instance. Thus, the invention may also be applied in devices having no touch-screen.

According to some embodiments, a predetermined activation input may be required from the user in order to enter an input (to the input area 200 or another input means arranged during the inactive mode) to trigger establishment of the input area 200 in the data processing device ED, and/or to detect an input as an appropriate input when in the inactive mode. This embodiment may be applied with some or all of the above-illustrated input methods. The input could be a simultaneous key press when making notes to the input area, for instance. Thus, inputs can be made if the specific key is pushed at the same time. In an alternative embodiment, a specific key combination has to be pushed before inputs can be made in the screen saver mode. In another embodiment, a stylus storage/fastening means on the data processing device ED are equipped with a sensor detecting removal of the stylus. A sensor may be connected to the present functionality such that the removal of the stylus is detected as an activation input. For instance, the input area 200 is automatically established after the stylus is removed from the storage position. In another embodiment, the required activation input could be a push of a track ball (moving the cursor) in a particular position or a push of an additional key. These embodiments enable unnecessary inputs caused by unwanted keys strokes or by other kinds of input methods to be avoided or reduced. The application of a predetermined activation input is especially useful in combination with a keypad input since easily occurring unwanted keypad inputs may then be avoided or at least reduced.

FIG. 3 illustrates a method according to an embodiment. The method is implemented by the data processing device ED, in one embodiment the steps of FIG. 3 are controlled by the screen saver SCS functionality. In step 301, the screen saver (SCS) is activated based on a screen saver initiation trigger, which could be a predetermined idle period after the last input from the user. An input area (200) is arranged on the screen (SC) in step 302. The data processing device ED is in steps 303, 304 configured to receive any inputs from the user. The process may actively continuously check whether any input is received (303, 304) or passively act (enter step 305) when an input is received from input detection means, such as touch screen means.

When an input is received, it is determined 305 whether the input is for deactivating the screen saver (SCS). If so, the screen saver is deactivated 306 and the current screen saver mode specific process may end. In one embodiment, a specific key or key combination is predetermined as the trigger for deactivating the screen saver. Thus, the device is configured to check in step 305 whether the input from the user matches the trigger. If the input matches the trigger, the device is configured to deactivate the screen saver and to remove the input area (200).

If the input is not for deactivating the screen saver, the device is configured to store the data representing the input and/or to display 307 the input. It is to be noted that instead of or in addition to the step of displaying the input, other actions may be performed for the input, as will be illustrated below. After step 307, the process may return to step 303 to detect new inputs.

Figure 4:
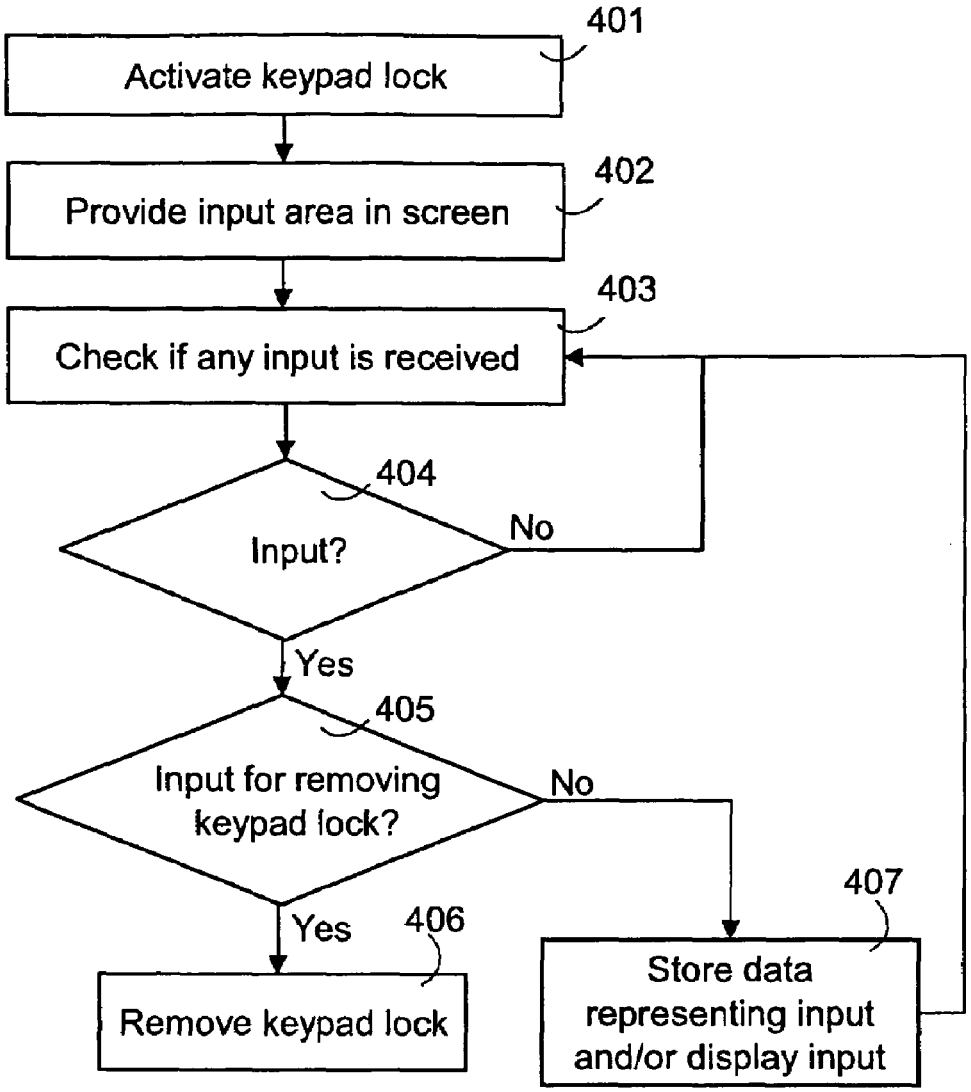
FIG. 4 is a flow diagram showing a method according to another embodiment.

FIG. 4 is a flow diagram showing a method according to another embodiment. The method of FIG. 4 may be applied when a keypad lock (KPL) is activated 401, based on an input from the user or automatically. Similarly to that shown in FIG. 3, an input area is arranged 402 and inputs monitored 403. If an input is for removing the keypad lock, the keypad lock is removed 405. Otherwise the input may be stored and/or displayed in step 407 to the user.

As already mentioned, a predetermined activation input may also be required in the embodiment for a keypad lock (KPL). In one embodiment, a specific key needs to be pushed during input in order to enter an input, to trigger establishment of the input area 200 in the data processing device ED, and/or to detect an input as an appropriate input. In another embodiment, a specific activation area on the screen SC needs to be selected (for instance a small icon needs to be contacted by the stylus) in order to establish the input area 200. Further, the time for supplying the inputs after the activation of the input area 200 may be limited.

It is to be noted that the methods in FIGS. 3 and 4 may also be utilized simultaneously. For instance, when either the keypad lock or the screen saver mode is set, an input area is arranged, and no other input area is needed if the other is also activated later. The methods in FIGS. 3 and 4 are only some examples of arranging the inventive functionality. For instance, in an alternative method, only the inputs to the input area (200) are monitored and the detection of the screen saver deactivation and/or keypad lock removal input is a separate process to be executed by the screen saver (SCS). Thus, the input detection in the input area may be carried out by some entity other than the screen saver SCS.

As already mentioned, instead of the input area (200), the inputs during the inactive mode may be arranged by some other input method. For instance, voice recognition or a touch screen/keypad input without any input area 200 could be used.

In another embodiment, the input area (200) is removed, either automatically or on the basis of a user input. This may be carried out after step 307/407 or when a predetermined time period has elapsed after the activation of the input area 200, for instance. Further, this feature may be provided such that the inactive operating mode may still be continued. In an embodiment, a selectable icon or another type of input means is arranged in the data processing device ED for removing the input area (200) and returning to the basic screen saver mode without any input possibility. This further enables unwanted inputs to the input area to be avoided after the appropriate input has been created and/or stored. Further, as noted above, the input area 200 may be arranged on the basis of a predetermined key combination or another specific input from the user for triggering the establishment of the input area 200. Thus, after an appropriate input from the user, step 302 may be entered again. In a further alternative embodiment, also the screen saver is deactivated and/or the keypad lock is removed after step 307/407.

In the following, some embodiments will be illustrated, the features of which may be implemented instead of or in addition to step 307 in FIG. 3.

According to an embodiment, the data processing device ED is configured to prompt the user for one or more further actions regarding the input. This feature may be carried out immediately after detecting the input or after the inactive operating mode is exited (after step 306/406), for instance. In the first case, the inactive operating mode may be continued after an input has been received from the user and the one or more further actions have been carried out. For instance, the user may be requested to confirm the storage of the input and to select a storage position and a file name for the input. For this, a file folder view may be displayed for the user. In accordance with a received user input, the input is then stored (or not stored if the user input indicates this). It is to be noted that the input may be stored temporarily in step 307 or 407, and when the screen saver is deactivated 306 or the keypad lock is removed 406, the user may be prompted for the final storage of the input.

In an embodiment, the user is prompted to select an application and/or a file format for the input. The application and/or file type/format is then selected for the input in accordance with an input from the user. For instance, the user may determine that the input is a calendar entry, a note or an alarm. The input may then be stored in accordance with the selected format. It is possible thus to define the format of the input without necessarily activating the application already immediately after the deactivation of the screen saver mode or during the screen saver mode (for instance in step 307).

According to an embodiment, the data processing device ED is configured to activate an application (APP) for which the inputs in the inactive mode are submitted. The application to be activated may be selected on the basis of a user input as illustrated above, or in an automatic manner based on one or more properties of the input. This application may then process the data representing the input as appropriate, for instance display it (possibly in an application specific view), store it, and/or further process it in an application specific way. In one embodiment, the application is activated after the screen saver mode is deactivated 306 and/or after a keypad lock is removed 406, whereby the usage of the data processing device ED resources can be minimized when the data processing device ED is not actively used. The input may then be displayed when the active usage mode begins and the user may then return to his/her notes and further process them, for instance. It is possible to prompt the user for confirmation before activating the application for the input.

In a further embodiment, the device ED is configured to determine the type of the input received during the inactive mode. On the basis of the detected type or format of the input, the device ED is configured to select an appropriate application (APP) for processing the input. The device may be configured to activate the selected application and/or submit the data representing the input to the selected application. This embodiment enables multiple applications (APP) to which the input may be targeted, and the appropriate application may be automatically activated without any user input for selecting the application. According to another embodiment, the storage format may be defined (for instance in step 307/407) on the basis of the determination of the type or format of the input.

According to one embodiment, the input area 200 is an application-specific view. The input area may be arranged for entering data for at least one of the following applications: a word processing application, a phonebook or another contact management application, a notepad application, a calendar application, a messaging application, a drawing application, or a spreadsheet application. The respective application may be actively executed when in a screen saver mode, activated upon an input to the input area, or inputs may be buffered and submitted to the application when it is later activated, for instance when the screen saver is deactivated. The device ED may be configured to receive inputs for at least one of the above-mentioned applications by some alternative input method not involving the input area 200.

According to another embodiment, the device ED comprises a text recognition application and is configured to submit the input to the text recognition application for determining the text data representing the input. This embodiment thus enables free-form entries in the inactive mode to be converted to complete text for a text-processing application. Further, the recognized text could then be displayed in the application view and stored as a text document, even automatically. In another embodiment, instructions from the user for controlling one or more of the functions of the data processing device may be carried out based on the detected text format. For instance, if an input representing command "STORE" is detected, the device activates storage of the input in the input area associated with the detected store command.

According to yet another embodiment, the input is submitted to at least one external device such as a network element. The input may thus be transmitted using a transmitter of the electronic device ED. For instance, the input may be submitted by a short range data transmission technique to local device(s). Alternatively, an appropriate message may be formed for the input for transmission to a mobile network such as one in accordance with the 3GPP system. For instance, the input may be included in a short message sent to a short message center.

In a further embodiment the input is submitted to a network element performing some further action for the input. The input may then be stored in the network and/or used for some service by the network.

In one embodiment the data processing device comprises a client for mobile instant messaging and presence service (IMPS). The input may be submitted to the client which then arranges the transmission of the input by a IMPS specific message to a IMPS server. In some alternative solutions the input area 200 is for entering inputs to the IMPS, or an IMPS application is activated in the ED on the basis of predetermined activation input. The IMPS server may store the input in the data processing device's information and possibly submit this information to other IMPS clients (authorized to receive IMPS information of the data processing device ED) as presence information or as an instant message. More information on one feasible IMPS solution is available at the OMA (Open Mobile Alliance) WWW site (www.openmobilealliance.org). It is to be noted that the ED may be arranged to support only a presence or an instant messaging application instead of both of them. This embodiment enables the user of the data processing device ED to easily specify personal presence information for an interest group even when the device ED is in an inactive mode. For instance, when the keypad lock is active, the user could still quickly input words "In meeting" and activate transmission of this message to the IMPS system, which then automatically distributes this information to his friends. In another example the user could easily change his or her status in the IMPS system by selecting another status via the user interface of the ED although the screen saver SCS would be activated in the ED.

It should be appreciated that the above-illustrated embodiment may be combined in various ways. It is obvious to one skilled in the art that as technology advances, the basic idea of the invention may be implemented in many different ways. The invention and its embodiments are thus not restricted to the above examples but may vary within the scope of the claims. Different features may thus be omitted, modified or replaced by equivalents.

The invention claimed is:

1. An electronic device comprising a user interface component and a processing unit configured to set the user interface component in an inactive operating mode to be applied during non-active or limited usage of the user interface component, wherein the electronic device is configured to detect a user input on a touch screen during the inactive mode, the device is configured to store the user input during the inactive operating mode, the device is configured to activate an application for processing the stored user input after exiting the inactive operating mode, the device is configured to submit the user input for the application, and the device is configured to prompt the user for a further action after exiting the inactive operating mode.

2. A device according to claim 1, wherein the device is configured to determine the type of the input in the input area.

3. A device according to claim 2, wherein the device is configured to select an appropriate application for processing the input on the basis of the detected type of the input, and the device is configured to activate the selected application and/or submit the data representing the input to the selected application.

4. A device according to claim 1, wherein the device in the inactive operating mode is configured to receive data for at least one of the following: a word processing application, a phonebook or another contact management application, a notepad application, a calendar application, a messaging application, a drawing application, or a spreadsheet application.

5. A device according to claim 1, wherein the device comprises a screen and a screen saver facility, wherein the device comprises a processing unit configured to set the screen in the inactive operating mode when the screen saver is activated.

6. A device according to claim 1, wherein the device comprises a keypad and a keypad locking facility, and the device comprises means to set the keypad in the inactive operating mode when the keypad lock is activated.

7. A device according to claim 1, wherein the device is configured to receive an input, trigger an arrangement of the input reception means, or detect an input as an appropriate input in the inactive operating mode if a predetermined activation input has been received from the user when the device is in the inactive operating mode.

8. A device according to claim 1, wherein the device is configured to continue in the inactive operating mode after storing the input.

9. A device according to claim 1, wherein the device is configured to detect input of a predetermined activation to allow receipt of the user input.

10. A method for receiving inputs by an electronic device comprising a user interface component, the method comprising:

setting the user interface component in an inactive operating mode for non-active or limited usage of the user interface component, detecting a user input on a touch screen in the inactive mode, storing the user input during the inactive operating mode, activating an application for processing the stored user input after exiting the inactive operating mode, submitting the user input for the application, and prompting the user for a further action after exiting the inactive operating mode.

11. *A* method according to claim 10, wherein the input is presented in a user interface component of the electronic device.

12. *A* method according to claim 10, wherein the touch screen is set in the inactive operating mode when a screen saver is activated, and receiving the input when the screen saver is active.

13. A method according to claim 10, wherein a keypad is set in the inactive operating mode when a keypad lock is activated, and receiving the input when the keypad lock is activated.

14. A method according to claim 10, further comprising:

detecting input of a predetermined activation to allow receipt of the user input.

15. A [computer program product embodied on a computer readable] *non-transitory* medium *comprising computer program code* downloadable into a memory of a data processing device comprising a user interface component and means for setting the user interface component in an inactive operating mode and executable in a processor of the data processing device, [the computer program product] comprising:

a program code part for controlling the data processing device to store a user input during the inactive operating mode, a program code part for controlling the data processing device to activate an application for processing the stored user input after exiting the inactive operating mode, a program code part for controlling the data processing device to submit the user input for the application, and a program code part for controlling the data processing device to prompt the user for a further action after exiting the inactive operating mode.

16. A [computer program product] *non-transitory medium comprising computer program code* according to claim 15, further comprising a program code part for activating an application to which data representing the input in the input area is fed.

17. A [computer program product] *non-transitory medium comprising computer program code* according to claim 15, further comprising:

a program code part for controlling the data processing device to detect input of a predetermined activation to allow receipt of the user input.

18. An apparatus, comprising:

a processor; and a memory unit communicatively connected to the processor and including:

computer code for controlling a data processing device to store a user input during an inactive operating mode, computer code for controlling the data processing device to activate an application for processing the stored user input after exiting the inactive operating mode, computer code for controlling the data processing device to submit the user input for the application, and computer code for controlling the data processing device to prompt the user for a further action after exiting the inactive operating mode.

19. An apparatus according to claim 18, wherein the processor is configured to present the input in a user interface component of the apparatus.

20. An apparatus according to claim 18, wherein the apparatus is a mobile communications device.

21. An apparatus according to claim 18, wherein the apparatus is a module for a mobile station.

22. An apparatus according to claim 18, wherein the memory unit further includes:

computer code for controlling the data processing device to detect input of a predetermined activation to allow receipt of the user input.

* * * * *